(12) United States Patent
Deck et al.

(10) Patent No.: US 12,470,093 B2
(45) Date of Patent: Nov. 11, 2025

(54) MONITORING SYSTEM FOR AN ELECTRICAL TRANSMISSION AND/OR DISTRIBUTION NETWORK

(71) Applicant: Hitachi Energy Ltd, Zürich (CH)

(72) Inventors: Bernhard Deck, Weilheim (DE); Stephan Gerspach, Herrischried (DE); Michele Luvisotto, Västerås (SE)

(73) Assignee: HITACHI ENERGY LTD, Zürich (CH)

( * ) Notice: Subject to any disclaimer, the term of this patent is extended or adjusted under 35 U.S.C. 154(b) by 91 days.

(21) Appl. No.: 18/557,175

(22) PCT Filed: Apr. 25, 2022

(86) PCT No.: PCT/EP2022/060794
§ 371 (c)(1),
(2) Date: Oct. 25, 2023

(87) PCT Pub. No.: WO2022/229040
PCT Pub. Date: Nov. 3, 2022

(65) Prior Publication Data
US 2024/0213820 A1    Jun. 27, 2024

(30) Foreign Application Priority Data
Apr. 26, 2021    (EP) .................................... 21170493

(51) Int. Cl.
*H04W 64/00*    (2009.01)
*H02J 50/80*    (2016.01)
*H02J 50/90*    (2016.01)

(52) U.S. Cl.
CPC .............. *H02J 50/90* (2016.02); *H02J 50/80* (2016.02); *H04W 64/00* (2013.01)

(58) Field of Classification Search
CPC .......... H04W 64/00; H02J 50/90; H02J 50/80
See application file for complete search history.

(56) References Cited

U.S. PATENT DOCUMENTS 4,998,095 A * 3/1991 Shields ................ G08B 25/016
340/8.1
5,552,767 A * 9/1996 Toman ..................... G08B 5/38
340/552

(Continued)

FOREIGN PATENT DOCUMENTS

JP          S6417196 A     1/1989
JP       2005293600 A     10/2005
(Continued)

*Primary Examiner* — Hoi C Lau
(74) *Attorney, Agent, or Firm* — PROCOPIO, CORY, HARGREAVES & SAVITCH LLP

(57) ABSTRACT

A monitoring system for an electrical transmission and/or distribution network is disclosed. The system comprises a short-range wireless transceiver arranged at a predetermined position relative to an equipment device and configured to receive a signal from a portable device, and a controller configured to determine a location of the portable device based at least partially on the received signal. The controller is further configured to verify if the determined location is within a predetermined alert zone at least partly surrounding the equipment device, and to generate an alert signal in case the determined location is verified to be within the alert zone.

18 Claims, 5 Drawing Sheets

(56) References Cited

U.S. PATENT DOCUMENTS

| | | | | |
|---|---|---|---|---|
| 5,760,686 A * | 6/1998 | Toman | | G08B 5/38 340/552 |
| 5,825,283 A * | 10/1998 | Camhi | | B60R 25/241 701/1 |
| 6,559,774 B2 * | 5/2003 | Bergan | | G08G 1/095 340/908 |
| 6,879,300 B2 * | 4/2005 | Rochelle | | G08B 21/0247 340/573.3 |
| 6,963,278 B2 * | 11/2005 | Frame | | B66C 15/045 340/539.22 |
| 7,031,663 B2 * | 4/2006 | Heinonen | | H04M 11/002 455/67.11 |
| 7,034,695 B2 * | 4/2006 | Troxler | | A01K 15/023 340/539.11 |
| 7,088,284 B2 * | 8/2006 | Young | | G01S 13/04 342/28 |
| 7,142,167 B2 * | 11/2006 | Rochelle | | G08B 21/0222 340/573.3 |
| 7,212,113 B2 * | 5/2007 | Zanovitch | | G08B 25/085 340/5.1 |
| 7,230,546 B1 * | 6/2007 | Nelson | | G08G 1/0955 340/940 |
| 7,242,288 B2 * | 7/2007 | Kaiser | | G08B 29/123 340/506 |
| 7,825,793 B1 * | 11/2010 | Spillman | | G08B 13/1966 340/539.18 |
| 7,890,235 B2 * | 2/2011 | Self | | G01S 19/51 340/539.22 |
| 7,898,407 B2 * | 3/2011 | Hufton | | G08B 21/245 340/286.07 |
| 7,944,359 B2 * | 5/2011 | Fong | | G08B 21/22 340/573.4 |
| 8,102,269 B2 * | 1/2012 | Boehm | | G08G 1/166 340/426.36 |
| 8,115,650 B2 * | 2/2012 | Dasilva | | F16P 3/141 340/572.1 |
| 8,164,439 B2 * | 4/2012 | Dempsey | | G08B 13/1427 367/137 |
| 8,212,653 B1 * | 7/2012 | Goldstein | | G08B 21/245 340/5.1 |
| 8,237,558 B2 * | 8/2012 | Seyed Momen | | G08B 21/245 340/286.07 |
| 8,248,263 B2 * | 8/2012 | Shervey | | G07C 9/28 340/8.1 |
| 8,289,170 B2 * | 10/2012 | Pryor | | G08B 21/0233 340/435 |
| 8,547,220 B1 * | 10/2013 | Dempsey | | G08B 13/1627 367/137 |
| 8,564,452 B2 * | 10/2013 | Schaible | | G08B 21/18 340/572.1 |
| 8,648,709 B2 * | 2/2014 | Gauger | | G08G 1/0962 340/539.1 |
| 8,842,019 B2 * | 9/2014 | Boccola | | G08B 21/24 340/686.1 |
| 8,917,172 B2 * | 12/2014 | Charych | | A01K 15/023 340/539.11 |
| 8,981,955 B2 * | 3/2015 | Schaible | | F16P 3/14 340/685 |
| 9,041,546 B2 * | 5/2015 | Pryor | | F16P 3/145 340/686.6 |
| 9,513,606 B1 * | 12/2016 | Larsen | | G05B 9/02 |
| 10,127,739 B2 * | 11/2018 | Megal | | G07C 5/0841 |
| 10,469,993 B2 * | 11/2019 | Arunachalam | | H04W 4/02 |
| 10,470,008 B2 * | 11/2019 | Arunachalam | | H04W 4/30 |
| 10,470,437 B1 * | 11/2019 | Landers | | H04W 4/024 |
| 10,536,811 B2 * | 1/2020 | Arunachalam | | G01S 13/931 |
| 10,564,196 B2 * | 2/2020 | Bernheim | | G01R 22/066 |
| 10,674,317 B2 * | 6/2020 | Arunachalam | | G01S 5/0036 |
| 10,694,336 B2 * | 6/2020 | Arunachalam | | H04L 67/52 |
| 10,885,758 B2 * | 1/2021 | Johnson | | G06V 40/10 |
| 10,959,056 B1 * | 3/2021 | Alsahlawi | | G06Q 50/08 |
| 10,984,644 B1 * | 4/2021 | Alsahlawi | | G08B 25/10 |
| 11,238,717 B2 * | 2/2022 | Johnson | | G08B 21/02 |
| 11,356,807 B2 * | 6/2022 | Arunachalam | | H04L 67/303 |
| 11,614,202 B2 * | 3/2023 | Frederick | | F16P 3/145 340/551 |
| 11,635,529 B2 * | 4/2023 | Pegg | | G01S 19/51 340/539.13 |
| 11,657,660 B2 * | 5/2023 | Megal | | G07C 5/0841 701/34.4 |
| 11,676,484 B2 * | 6/2023 | Jarrett | | G08G 1/164 340/908 |
| 11,710,085 B2 * | 7/2023 | Alsahlawi | | G06V 10/774 706/12 |
| 11,763,653 B2 * | 9/2023 | Johnson | | G01S 17/93 340/539.13 |
| 11,889,385 B2 * | 1/2024 | Arunachalam | | G08B 21/22 |
| 11,937,147 B2 * | 3/2024 | Alsahlawi | | H04W 4/029 |
| 12,124,979 B2 * | 10/2024 | Alsahlawi | | G06N 5/04 |
| 12,135,558 B2 * | 11/2024 | Utter | | G05D 1/0225 |
| 2001/0030610 A1 * | 10/2001 | Rochelle | | G08B 21/0222 342/146 |
| 2002/0024424 A1 * | 2/2002 | Burns | | H04B 3/54 340/538 |
| 2002/0175831 A1 * | 11/2002 | Bergan | | G08G 1/095 340/908 |
| 2002/0196151 A1 * | 12/2002 | Troxler | | G08B 21/0277 340/573.3 |
| 2003/0151508 A1 * | 8/2003 | Frame | | B66C 15/045 340/8.1 |
| 2005/0078006 A1 * | 4/2005 | Hutchins | | G08B 13/2454 340/561 |
| 2005/0104764 A1 * | 5/2005 | Young | | G01S 13/04 342/27 |
| 2005/0128077 A1 * | 6/2005 | Seemann | | G07C 9/28 340/5.2 |
| 2005/0248450 A1 * | 11/2005 | Zanovitch | | G08B 25/14 340/506 |
| 2005/0253723 A1 * | 11/2005 | Shafer | | G08B 13/2422 235/462.13 |
| 2006/0082452 A1 * | 4/2006 | Kaiser | | G08B 17/00 340/506 |
| 2006/0238370 A1 * | 10/2006 | Park | | G01S 5/12 340/539.2 |
| 2007/0057786 A1 * | 3/2007 | McClure | | G01R 33/28 340/551 |
| 2007/0188318 A1 * | 8/2007 | Cole | | G06Q 10/08 340/572.1 |
| 2007/0222599 A1 * | 9/2007 | Coveley | | G07C 9/28 340/572.4 |
| 2008/0012761 A1 * | 1/2008 | Derrick | | G01S 19/34 342/357.74 |
| 2008/0018472 A1 * | 1/2008 | Dasilva | | G08B 25/016 340/572.4 |
| 2008/0106405 A1 * | 5/2008 | Zanovitch | | G08B 25/14 340/540 |
| 2008/0149584 A1 * | 6/2008 | Martinelli | | G06Q 10/08 215/202 |
| 2009/0216381 A1 * | 8/2009 | Gooch | | A62C 3/16 700/277 |
| 2009/0267787 A1 * | 10/2009 | Pryor | | F16P 3/145 340/686.6 |
| 2009/0303054 A1 * | 12/2009 | Fong | | G08B 21/22 340/573.4 |
| 2010/0026509 A1 * | 2/2010 | Boehm | | G08G 1/166 455/41.1 |
| 2010/0289662 A1 * | 11/2010 | Dasilva | | G01V 15/00 340/686.6 |
| 2010/0321180 A1 * | 12/2010 | Dempsey | | G08B 13/1427 340/539.12 |
| 2010/0328073 A1 * | 12/2010 | Nikitin | | G06K 7/0008 340/572.1 |
| 2011/0227748 A1 * | 9/2011 | Schaible | | F16P 3/147 340/686.6 |
| 2011/0279261 A1 * | 11/2011 | Gauger | | B66F 9/0755 340/669 |
| 2012/0001765 A1 * | 1/2012 | Boccola | | G08B 21/24 340/686.1 |

(56) References Cited

U.S. PATENT DOCUMENTS

| | | | |
|---|---|---|---|
| 2012/0112905 A1* | 5/2012 | Wecker | F16P 3/147 340/539.13 |
| 2012/0280812 A1* | 11/2012 | Sheikman | G01S 13/876 340/539.13 |
| 2013/0021174 A1* | 1/2013 | Silzer, Sr. | G05D 1/0278 701/34.4 |
| 2013/0207803 A1* | 8/2013 | Charych | A01K 15/023 340/539.11 |
| 2014/0043168 A1* | 2/2014 | Schaible | F16P 3/147 340/686.6 |
| 2014/0062695 A1* | 3/2014 | Rosen | G08B 21/0219 340/539.13 |
| 2014/0159888 A1* | 6/2014 | Gauger | F16P 3/16 340/438 |
| 2014/0191869 A1* | 7/2014 | Frederick | F16P 3/145 340/551 |
| 2014/0266759 A1* | 9/2014 | Pryor | E02F 3/16 340/686.6 |
| 2016/0044629 A1* | 2/2016 | Larson | G01S 13/825 340/8.1 |
| 2016/0125348 A1* | 5/2016 | Dyer | G06Q 10/08 705/7.42 |
| 2016/0180685 A1* | 6/2016 | Glasgow | G06Q 10/06398 340/540 |
| 2017/0303187 A1* | 10/2017 | Crouthamel | H04W 48/10 |
| 2020/0038702 A1* | 2/2020 | Gish | F03G 5/064 |
| 2020/0160682 A1* | 5/2020 | Johnson | F16P 3/147 |
| 2020/0226895 A1* | 7/2020 | Masters | G08B 25/08 |
| 2021/0158207 A1* | 5/2021 | Alsahlawi | G06N 20/00 |
| 2021/0176601 A1* | 6/2021 | Alsahlawi | H04W 4/021 |
| 2021/0192915 A1* | 6/2021 | Johnson | H04W 4/021 |
| 2022/0069563 A1* | 3/2022 | Donnangelo | H02H 3/06 |
| 2022/0223022 A1* | 7/2022 | Johnson | G01S 17/93 |
| 2023/0215258 A1* | 7/2023 | Selevan | G08G 1/164 340/933 |
| 2023/0316166 A1* | 10/2023 | Alsahlawi | G06K 19/07762 706/12 |
| 2024/0213820 A1* | 6/2024 | Deck | H02J 50/80 |

FOREIGN PATENT DOCUMENTS

| | | |
|---|---|---|
| JP | 2007052671 A | 3/2007 |
| KR | 1020170084808 A | 7/2017 |

* cited by examiner

MONITORING SYSTEM FOR AN ELECTRICAL TRANSMISSION AND/OR DISTRIBUTION NETWORK

CROSS-REFERENCE TO RELATED APPLICATIONS

The present application is a national stage entry of International Patent Application No. PCT/EP2022/060794, filed on Apr. 25, 2022, which claims priority to European Patent Application No. 21170493.7, filed on Apr. 26, 2021, which are both hereby incorporated herein by reference as if set forth in full.

TECHNICAL FIELD

The present inventive concept generally relates to the field of electrical transmission and/or distribution networks. More particularly it relates to safety systems for persons working with such networks in general, and electrical substations in particular.

BACKGROUND

Workplace safety is crucial for technicians and field operators working around high-voltage equipment of electrical transmission and/or distribution networks. Safety precautions may therefore be taken with the aim of protecting the employees from accidental exposure to energised components. The safety precautions may include safety equipment installed at the facilities, such as physical barriers, warning signs and clearly marked evacuation routes, and personal protective accessories such as gloves, face masks and the like. Training, authorisation, and practical routines are also crucial to prevent incidents and fatalities.

Observing the above precautions and practises may reduce the risk for employees being exposed to energised parts of high-voltage equipment. However, there is still a need for techniques for improving the workplace safety of electrical transmission and/or distribution networks.

SUMMARY

An object of a least some of the embodiments of the present inventive concept is to provide an improved alternative to the above-mentioned prior art. This and other objects may be achieved by means of a monitoring system and method having the features defined in the independent claims. Preferable embodiments of the inventive concept are defined by the dependent claims.

Hence, according to a first aspect a monitoring system for an electrical transmission and/or distribution network is provided, comprising a short-range wireless transceiver and a controller. The transceiver is configured to be arranged at a predetermined position relative to an equipment device of the electrical transmission and/or distribution network, and to receive a signal from a portable device. The controller is configured to determine a location of the portable device based at least partially on the received signal, and to verify if the determined location is within a predetermined alert zone at least partly surrounding the equipment device. Further, the controller may be configured to generate an alert signal in case the determined location is verified to be within the alert zone.

According to a second aspect, a monitoring method is provided, comprising receiving a signal from a portable device and determining a location of the portable device relative to an alert zone at least partly surrounding an equipment device of an electrical transmission and/or distribution network. The location is determined at least partially on the received signal and a predetermined position of the transceiver relative to the equipment device. Further, the method comprises verifying if the determined location is within the alert zone, and generating an alert signal in case the determined location is within the alert zone.

The present inventive concept is based on the technical insight that one or several short-range wireless transceivers can be utilised to detect if a portable device is arranged within a predetermined alert zone around an equipment device. The portable device may preferably be carried by a person moving around in an environment in which the equipment device is arranged, such as for example an electrical substation, and the alert signal may be generated in case the person comes too close to the equipment device, i.e., enters the predetermined alert zone. It should be noted that by determining the location of the portable device relative to the transceiver and thus the equipment device, information may be retrieved not only about a distance between the person and the equipment device, but also the direction from which the person approaches the equipment device. This allows for the alert zone to be irregular or asymmetric in shape and hence more precisely defined around the equipment device. The extension of the alert zone may thus vary between different sides of the equipment device. The alert zone may hence be adjusted or tailored manually so as to meet specific needs for the actual environment, or be predetermined based on for example a stipulated, general clearance distance (plus a possible safety margin).

If it is detected that a portable device is arranged within the alert zone, the alert signal may be generated to notify or warn the person carrying the portable device about this fact. Alternatively, or additionally a safety block mechanism may be activated, which de-energises the equipment device. These actions will be discussed in greater detail in the following.

The monitoring system may be based on local decisions and does not require any communication between different transceivers or between a transceiver and any central control or monitoring system. Further, the present inventive concept is advantageous over techniques based on for example global navigation satellite systems, since the present monitoring system works also in environments that are shielded from satellite signals.

The alert signal may be transmitted to the portable device by the transceiver. This allows for the portable device to inform a person carrying the portable device that he or she has entered the alert zone, and that he or she is approaching a potentially hazardous equipment device. The alert signal may thus trigger a warning mechanism of the portable device, which for example may be brought to vibrate or issue a sound or light signal calling for the attention of the carrier. In some examples, the portable device may further indicate when it exits the alert zone, i.e., when the person carrying the portable device moves out of the alert zone again. The indication may for example be based on the transceiver ceasing the transmission of the alert signal or transmitting a further signal to the portable device indicating that it is no longer in the alert zone.

Alternatively, or additionally the alert signal may be transmitted to a safety block mechanism. The safety block mechanism may for example be configured to cause the equipment device to enter a safe mode in response to receipt of the alert signal. The safe mode may for example be characterised by the equipment device being de-energised. Thus, the monitoring system according to the present inventive concept may be capable of monitoring the movement of a person carrying the portable device, and de-energising hazardous equipment in case the person is getting too close, i.e., within the predetermined alert zone around the equipment.

In an example, the safety block mechanism may be configured to prevent the equipment device from being energised in case the alert signal is received. Put differently, the monitoring system may verify that the portable device is not within the alert zone before the equipment device is energised. Should it be verified that the portable device actually is arranged within the alert zone, the monitoring system may act to ensure that the equipment device is not energised.

The controller may be configured to determine the location of the portable device based on a determined distance between the portable device and the short-range wireless transceiver, and further on determined directional information of the signal from the portable device. The determination of the location may hence involve determining the direction of propagation of the signal transmitted by the portable device and incident on an antenna of the transceiver. The directional information may for example be achieved by determining a maximum signal strength during antenna rotation, or by measuring the time difference of arrival between individual elements of an antenna array of the transceiver. The transceiver may for example comprise an array of antenna elements allowing for an angle of arrival (AoA) or the received signal to be determined. The AoA may be determined by measuring a difference in phase of the signal received at individual antenna elements in the array, wherein the determined AoA may indicate the angular direction in which the portable device is arranged in relation to the transceiver. Preferably, the AoA determination may be combined with a distance determination based on the received signal strength for obtaining a measure of the actual location of the portable device relative to the transceiver and hence the equipment device.

The present inventive concept is advantageous in that is allows for the location of the portable device to be determined using the signal from the portable device as received by a single transceiver. However, several transceivers may also be used to verify the location of the portable device but unlike for example triangulation-based techniques this is not a requirement in the context of the present disclosure.

It is appreciated that the determined location of the portable device may not be limited to the alert zone, but to the coverage area of the transceiver. This allows for movements of the person carrying the portable device to be monitored and tracked also outside the alert zone.

The controller may be configured to receive information indicating whether the equipment device is energised or de-energised. This information can be used for determining if the alert signal should be generated or not when the portable device is determined to be within the alert zone. Preferably, the alert signal may be generated only in case the equipment device is energised and thus dangerous to approach. The monitoring system may hence provide a warning functionality which alerts a person approaching live equipment.

The information indicating the status of the equipment device, such as whether the equipment device is energised or de-energised, may be received from the equipment device itself, for example via a serial interface or a wired communication channel between the equipment device and the controller and/or the transceiver. This allows for the monitoring system to operate and make decisions locally, without involving any central controller or central intelligence. Alternatively, or additionally the information may be received from a central node, such as a central controller, configured to control and coordinate a plurality of transceivers installed at various locations throughout a substation or the like.

The controller may be integrated in the transceiver, such that the transceiver and the controller form a common unit. This allows for the functionality and intelligence of the present inventive concept to be provided in a single unit that is relatively easy to move and install at the desired locations—either permanently or temporarily, depending on the actual safety requirements.

In some further examples, the controller may be arranged in the portable device. The skilled person will appreciate that the controller, or the functionality of a controller as outlined above, also may be distributed over two or more different entities such as the central station control system, the individual transceivers, the portable device, and a remote cloud-based server.

As already mentioned, the monitoring system may comprise a central controller, or central node, and a plurality of transceivers communicatively connected to the central node. The central controller may for example form part of a station control system. The connection may for example be achieved over a local network, or backbone, which may be wired or wireless. The central controller may be configured to receive the signal from the portable device from one or several of the transceivers, and may be configured to process the information from the transceivers to determine the location of the portable device, track the movement of the person over time, monitor the status of the equipment devices (such as keeping track of whether the equipment devices are energized or not, as mentioned above), generate the alert signal to be transmitted via the transceivers, or cause the transceivers to generate the alert signal, in response to the person being determined to be within the alert zone. The local network, or backbone may further be used for transmitting the alert signal to the safety block mechanism.

The central controller may in an example be configured to receive one or more signals from one or more portable devices via a plurality of transceivers and use that information to determine the location of the portable device(s). The determination of the location may for example involve triangulation between two or more of the transceivers.

The controller may be configured to track the movement of the portable device in relation to one or more transceivers and store the tracked movement in a database. This allows for tracking of personnel operating in proximity of the equipment devices, and further for their movements to be analysed at a later point in time, for example in case of incidents, to better understand the course of events leading to the incident.

The controller may be configured to share location information with other controllers, for example located arranged at other geographic places. The location information may for example be shared through a wide-area network. The transceiver may for example be arranged at a remote, or unmanned station, and the location information sent to a central control facility from which the station can be monitored and operated. In case the equipment device forms part of a first substation of the electrical transmission and/or distribution network, the controller may be configured to share the determined location with a control system of a second substation. This makes it possible to hinder the second substation from energising a feeder if a person is determined to be too close to a feeder termination at the first substation.

By short-range wireless transceiver, for brevity also referred to as "transceiver" in the present application, is generally meant a radio-frequency transmitter device utilising a technology such as Bluetooth, Wi-Fi, near-field communication, ultra-wideband and IEE 802.15.4. A short-range transceiver may typically be a low-power transmitter limited to 25-100 mW effective radiated power, limiting its useful range to a few hundred metres. The transceiver may also be referred to as an anchor or a beacon.

The equipment device may form part of the installed equipment of a substation. Substations may act as connection points between different transmission lines of electrical systems, and might additionally transform voltage from high to low, or the reverse, or perform any of several other important functions in electrical transmission or distribution networks. The substations and the installed equipment of various substations are often designed differently. The present inventive concept is advantageous in that it makes it easier for the field operator or technician to safely navigate through the substation assists in their work of accessing, examining and carrying out actions on the equipment.

The portable device may be integrated in a handheld device, such as a cell phone or a tablet, or in a garment or personal protective accessory such as for example a safety vest or protective helmet, which preferably may mandatory to wear for the personnel. The portable device may be configured to broadcast the signal, preferably constantly when being carried in the facility housing the equipment devices.

It will be appreciated that other embodiments than those described above are also possible. A skilled person will for example readily understand that the monitoring system may be capable of handling, i.e. determining the location of and sending an alert signal to, a plurality of portable devices carried by different persons within the facility. The system may hence be capable of identifying a specific portable device, out of a plurality, that is arranged within the alert zone and generate an alert signal that targets that specific portable device. This may for example be achieved by each portable device adding a unique identifier to the signal, which can be used by the controller for generating an alert signal that is addressed to a specific portable device. It will also be appreciated that any of the features and advantages of the embodiments described above for the monitoring system according to the first aspect may be combined with the method according to the second aspect.

Other objects, features and advantages of the enclosed embodiments will be apparent from the following detailed description, from the attached dependent claims as well as from the drawings. Those skilled in the art realize that different features of the present invention, even if recited in different claims, can be combined in embodiments other than those described in the following.

BRIEF DESCRIPTION OF THE DRAWINGS

Exemplifying embodiments will now be described in more detail with reference to the following appended drawings, on which.

A skilled person will readily understand that the sizes of the elements and regions as illustrated in the figures may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings, in which currently preferred embodiments are shown. The inventive concept may, however, be embodied in many different forms and should not be construed as limited to the embodiments set forth herein; rather, these embodiments are provided for thoroughness and completeness, and fully convey the scope of the invention to the skilled person.

Figure 1:
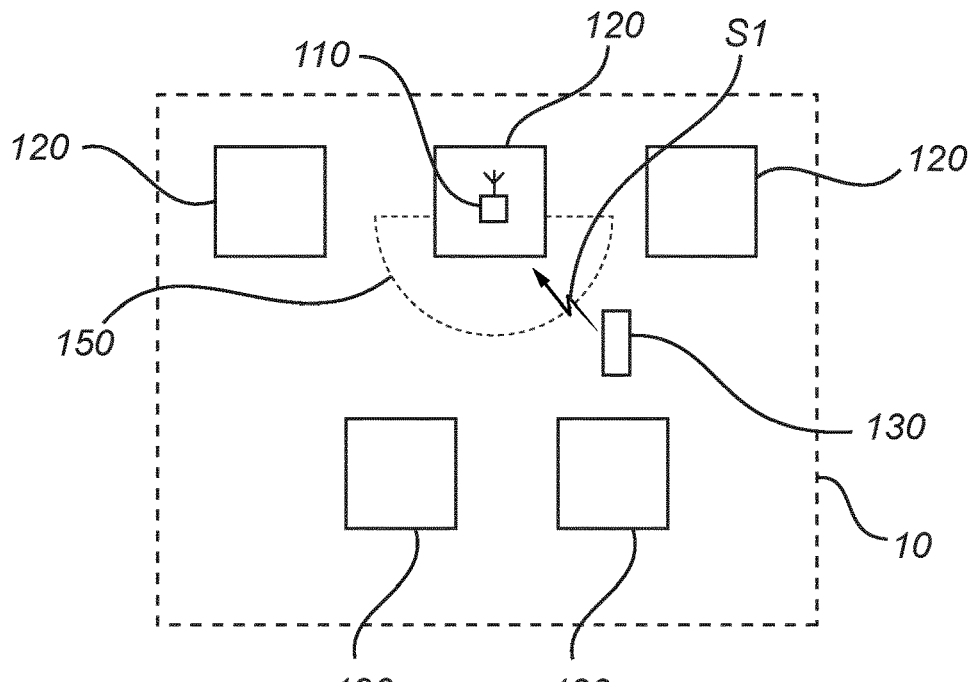
FIG. 1 is a schematic view of a monitoring system according to an embodiment.

With reference to FIG. 1, a monitoring system for an electrical transmission and/or distribution network is outlined. The system may comprise a short-range wireless transceiver 110, in the following also referred to as "receiver", arranged at a predetermined position relative to an equipment device 120 of the electrical transmission and/or distribution network. The transceiver 110 may be configured to receive a signal S1 from a portable device 130, and to send an alert signal in case a determined location of the portable device 130 is within an alert zone 150 at the equipment device 120.

The equipment device 120 may form part of a substation 10 and may for example be (or form part of) a lightning arrester, a power transformer, a busbar, a circuit breaker, a relay, and the like. The equipment device 120 may be energised, for example with high-voltage power, and may generate electromagnetic fields which can be harmful in close proximity of the equipment. Further, the equipment device 120 can comprise components or parts which normally are not energised, or which may be de-energised temporarily, and which may become energised unexpectedly or accidentally.

The equipment device 120 may be associated with the alert zone 150, which may be defined as a clearance that should be observed in order to avoid accidental contact with the equipment device 120 or a dangerous part of the equipment device 120. The alert zone 150 may in some examples be larger than the recommended or stipulated minimum clearance so as to allow for the alert signal to be generated with some safety marginal before the portable device 130 gets too close to the equipment device 120. The alert zone 150 may have a shape that varies in different directions from the equipment device 120. As illustrated in FIG. 1, the alert zone 150 may be defined by a certain radius measured from a point on the equipment device 120, such as the exposed live part to which access should be avoided. The alert zone 150 may for example extend on a first side of the equipment device 120, and not on a second side, depending on the location and accessibility of the dangerous part of the equipment. The alert zone 150 may correspond to a twodimensional area, such as the one indicated by the dashed line in the present figure, or by a three-dimensional volume in space.

The transceiver 110 may be arranged at a predetermined, or known, position relative to the equipment device 120 and/or the alert zone 150. The transceiver may hence be arranged at a known distance from the equipment device 120 or be collocated with the equipment device 120. In some examples the transceiver 110 may be part of or integrated with the equipment device 120. In further examples the transceiver 110 may be releasably or permanently attached to the equipment device 120. The signal incident on the transceiver 110 may be used to determine the location of the portable device 130 relative to the alert zone 150. The location may be determined based on a distance and a direction between the transceiver 110 and the portable device 130, as will be discussed in more detail with reference to FIGS. 3a and b, combined with the known positional relationship between the transceiver 110 and the equipment device 120 and/or the alert zone 150.

In the example in FIG. 1, the portable device 130 is arranged outside the alert zone 150. The portable device 130 may be configured to broadcast a radiofrequency signal S1, which for example may be configured to support the Bluetooth 5.1 direction finding functionality. The broadcast signal S1 may be received by the transceiver 110 and analysed by a controller (not shown) to determine the location of the portable device 130. Should it be determined that the portable device 130 is arranged within the alert zone 150, an alert signal may be generated by controller and sent via the transceiver 110. The alert signal may for example be transmitted to the portable device 130, which may be configured to act on the signal to notify a person carrying, or at least being in close vicinity of the portable device 130, that he or she is within or at least close to the alert zone 150. The portable device 130 may for example be configured to notify the person by means of an audio signal, a visual signal or a tactile signal. Alternatively, or additionally, the controller may send the alert signal to a dedicated alarm device, such as a siren or beacon light, which may be arranged to generate a warning signal based on the alert signal and hence notify any person approaching the equipment device.

In further examples, the alert signal may be transmitted to a safety block mechanism (not shown in FIG. 1), which may be configured to cause the equipment device 120 to enter a safe mode in response to the receipt of the alert signal. The safe mode may for example result in the equipment device 120 being de-energised.

In some examples, the alert signal may be generated only in case the equipment device is not already in a safe mode. Put differently, the monitoring system may be configured to check whether the equipment device 120 is energised or not, before any alert signal is generated. The alert signal may be generated in response to the equipment device 120 being dangerous to touch, i.e., being energised. Consequently, no alert signal may be generated should the equipment device 120 already be in the safe mode, i.e., be de-energised, such that it can be approached and touched without risk.

Figure 2:
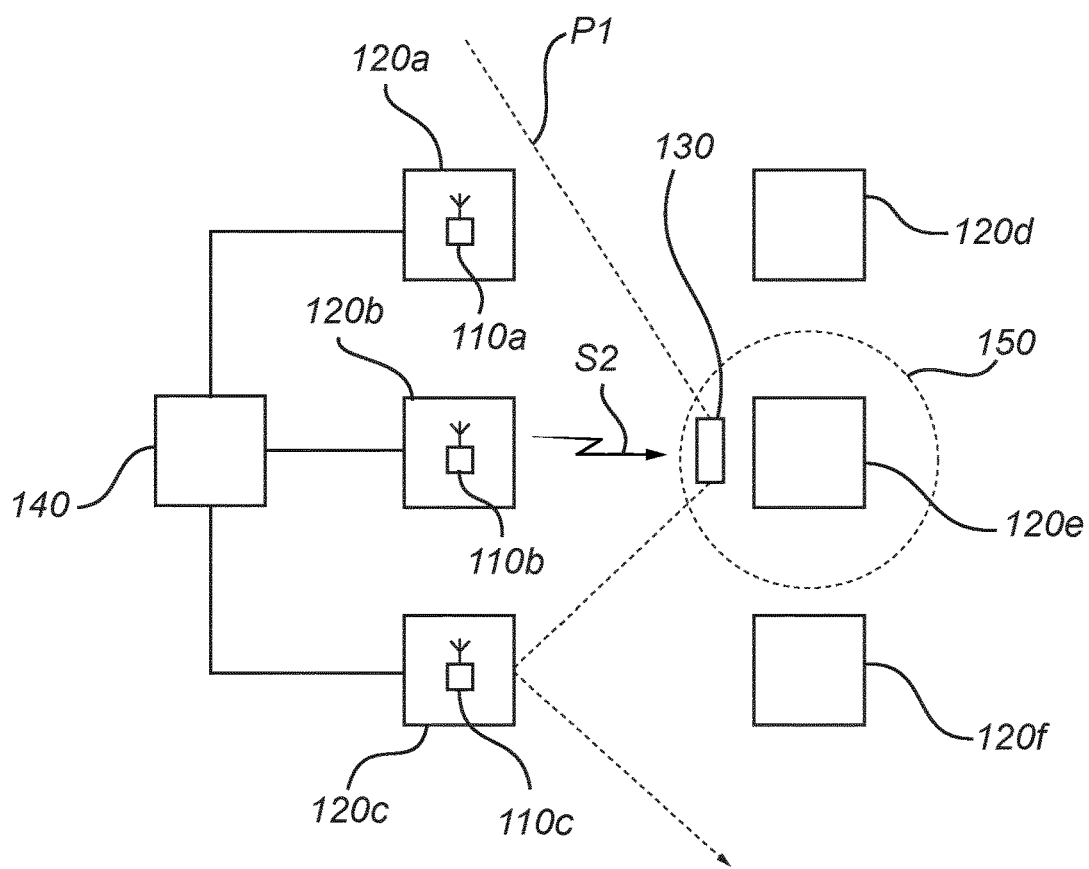
FIG. 2 is a schematic view of a monitoring system according to another embodiment.

FIG. 2 shows a monitoring system comprising a plurality of transceivers 120a, 120b, 120c (collectively referred to by reference numeral 120), which may be arranged at a respective equipment device 110a, 110b, 110c (collectively referred to by reference numeral 110). The monitoring system and the transceivers 120 may be similarly configured as the embodiment discussed above with reference to FIG. 1. Preferably, the monitoring system may be implemented in an environment comprising a plurality of equipment devices 110, such as the six exemplary equipment devices 120a-f illustrated in FIG. 2. One or several alert zones 150 may be defined, such as the one encircling equipment device 120e. The alert zone 150 at equipment device 120f may be monitored by transceiver 110b, which in the present example is arranged at the neighbouring equipment device 120b and at a predetermined location relative to the equipment device 120e. In case the portable device 130 enters the alert zone 150 the transceiver 110b may generate the above-discussed alert signal S2.

The transceivers 110 may be communicatively connected to the controller 140, which in the present example may be a central controller 140 that may be common to all three transceivers 110. The controller may be configured to determine the location of the portable device 130 based on the signal from the portable device 130 received at one of the transceivers 110, and/or by means of triangulation between two or more of the transceivers 110. The controller 140 may further be configured to track the movements of the portable device 130 through the environment comprising the equipment devices 120 and store the path P1 of the portable device 130 in a database for future reference and analysis. The tracking may be based on input from one or several of the transceivers 110. In the present example is shown how the portable device moves along the path P1 into the alert zone 150 at equipment device 120e, receives an alert signal S2 from transceiver 110b, leaves the alert zone 150 in response to the reception of the alert signal S2, continues to equipment device 120c, and then leaves the environment. The illustrated path P2 is the result of the monitoring of the movements of the portable device 130 performed by the transceivers 110, which may be configured to receive a signal S1 that is broadcast by the portable device 130 as it moves through the environment.

The transceivers 110 may communicate with the central controller 140 via a wired or wireless network. The network may in some examples comprise one or several relay nodes configured to transmit the communication signal from the transceivers 110 to the central controller 110. Such a network may also be referred to as a backbone network and may be provided to ensure that the short-range signal from the transceivers 110 is allowed to be correctly transmitted to the central controller 140. The central controller 140 may for example form part of a station control system.

The controller 140, which hence may be central and thus common to several transceivers 110, or local to each transceiver 110, may be configured to receive (or keep track of) a status of the equipment device associated with the alert zone 150. The controller 140 may hence have access to information indicating whether the equipment device is dangerous to approach or not, such as being energised or not, and may act accordingly.

An example of the transmission and receipt of a signal from the portable device 130 will now be illustrated with reference to FIGS. 3a and b.

Figure 3A:
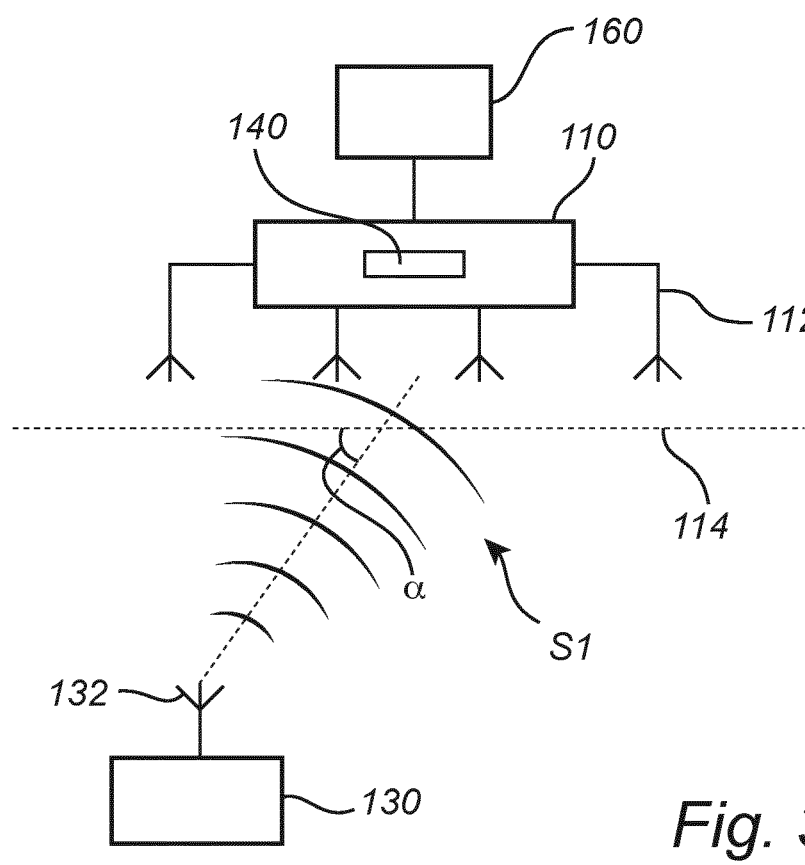
FIGS. 3a and b show examples of a transceiver and a portable device according to some embodiments.

FIGS. 3a and b show a transceiver 110 and a portable device 130 according to some embodiments, which may be similarly configured as the ones disclosed in connection with FIGS. 1 and 2. The transceiver 110 may comprise a controller 140, which in the present example may be integrated in the transceiver 140, and may be communicatively connected to a safety block mechanism 160 for causing the equipment device to enter a safe mode as mentioned above.

The transceiver 110 is configured to receive a signal S1 transmitted by the portable device 130. The transceiver 110 and the portable device 130 may for example be configured to support the Bluetooth 5.1 direction finding functionality.

As discussed above, the transceiver 110 may be arranged at a predetermined position relative the alert zone, whereas the portable device 130 may be carried by a person moving in the environment in which the equipment device is arranged.

FIG. 3a show a portable device 130 comprising a single antenna 132 for transmitting a radiofrequency signal, and a transceiver 110 comprising an array of antenna elements 112 for determining an angle of arrival (AoA) a of the signal S1. By using multiple antenna elements 112, a phase difference of the incident signal may be observed and used to determine the AoA and thus the direction in which the portable device 130 is arranged relative to the alert zone/equipment device. In the present example, the angle of arrival a is indicated as the angle α between a plane (indicated by the line 114 in FIG. 3a) defined by the array of antenna elements 112 and the line of sight between the array of antenna elements 112 and the antenna 132 of the portable device 130.

Figure 3B:
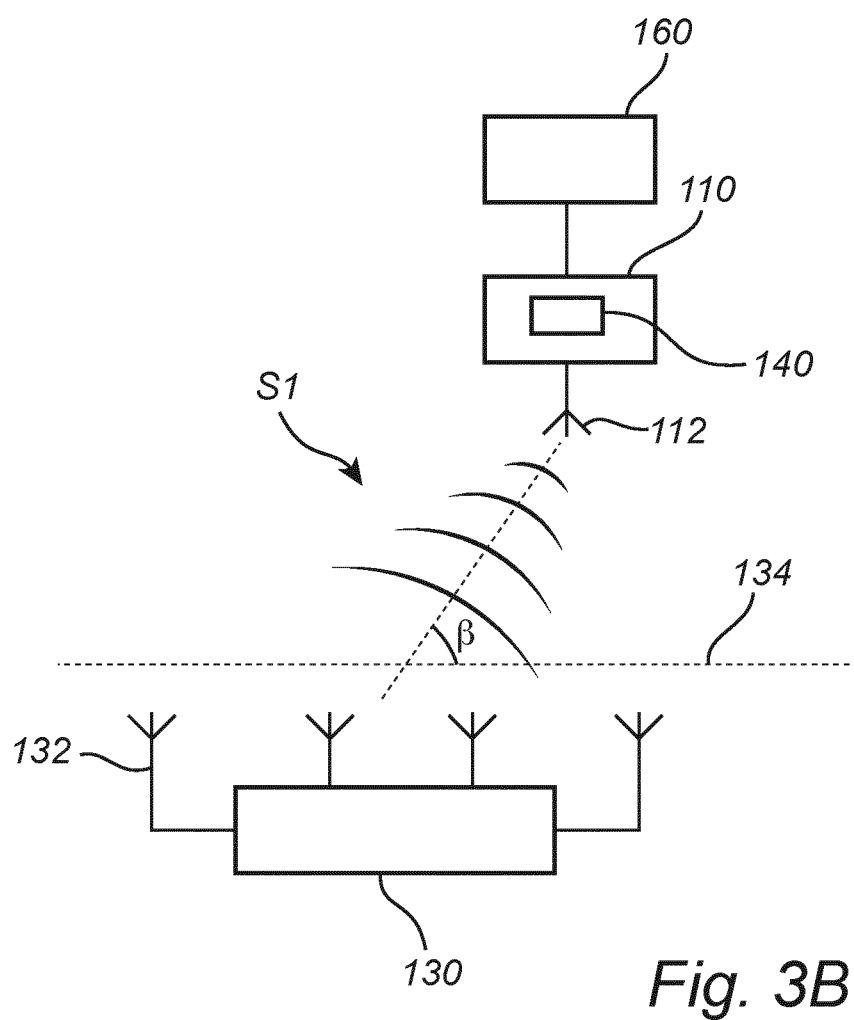

An alternative configuration is shown in FIG. 3b, wherein the portable device 130 comprises an array of antenna elements 132 and the transceiver 110 comprises a single antenna 112. Similar to the configuration in FIG. 3a a direction of the transmitted signal S1 may be determined by observing the phase. In FIG. 3b the direction may be defined as the angle of departure (AoD) β and may be described by the angle β between a plane (indicated by the line 134 in the present figure) defined by the array of antenna elements 132 of the portable device 130 and the line of sight between the array of antenna elements 132 and the antenna 112 of the transceiver 110.

Figure 4A:
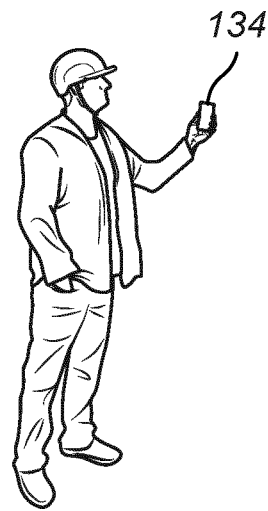
FIGS. 4a and b show examples of a transceiver according to some embodiments, arranged in a handheld device and in a personal protective accessory.
Figure 4B:
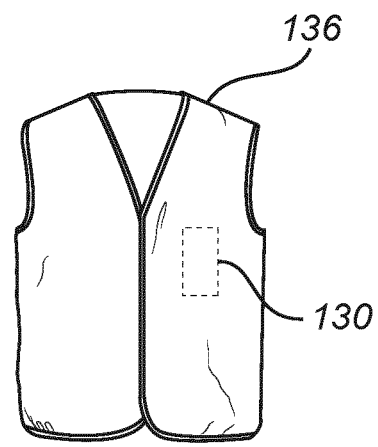

The portable device 130 may be configured to be carried by a person, such as a technician or a field operator, moving in an environment in which the equipment device is arranged, or from which the equipment device at least can be accessed. The portable device 130 may for example be arranged in a handheld device 134, such as a smart phone illustrated in FIG. 4a. Alternatively, the portable device 130 may be arranged in a personal protective accessory such as a safety vest 136 illustrated in FIG. 4b. Preferably, it should be mandatory to carry the portable device 130 in the vicinity of the equipment device, such as within the perimeter of the substation.

Figure 5:
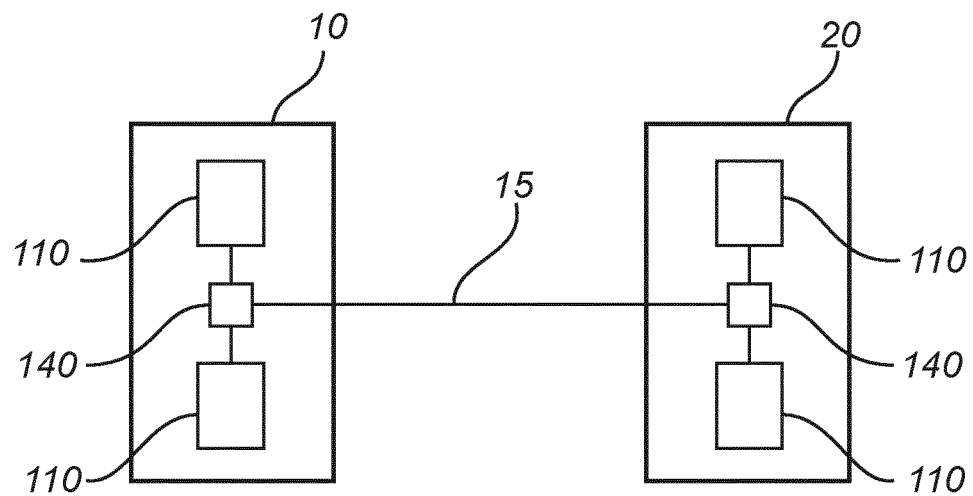
FIG. 5 is a schematic view of a monitoring system according to an embodiment.

FIG. 5 is a schematic illustration of a monitoring system according to an embodiment, which may be similarly configured as the monitoring systems discussed with reference to FIGS. 1-4. The monitoring system may be arranged in an environment comprising an equipment device and an alert zone as previously discussed. An example of such an environment may include a substation of the electrical transmission and/or distribution network, such as the first substation 10 shown in FIG. 5. The controller 140, which may be communicatively coupled to one or several transceivers 110, may be configured to determine the present location of a person carrying the portable device (not shown), and in particular to monitor whether the person is located within the alert zone or not. FIG. 5 illustrates that this information, pertaining to the location of the person carrying the portable device, may be transmitted to another substation 20, different from the first substation 10. Optionally, the second substation 20 may comprise a similar system, i.e., a controller 140 and one or several transceivers 110 for receiving a signal from a person carrying a similar portable device in the second substation 20.

By establishing a communication between the first substation 10 and the second substation 20, for example over a wide-area network 15, a location of the person in the first substation 10 may be shared with a controller 140 of the second substation 20, such that the second substation 20 can be hindered from energizing a feeder if the person is located within the alert zone of a feeder termination at the first substation 10.

Figure 6:
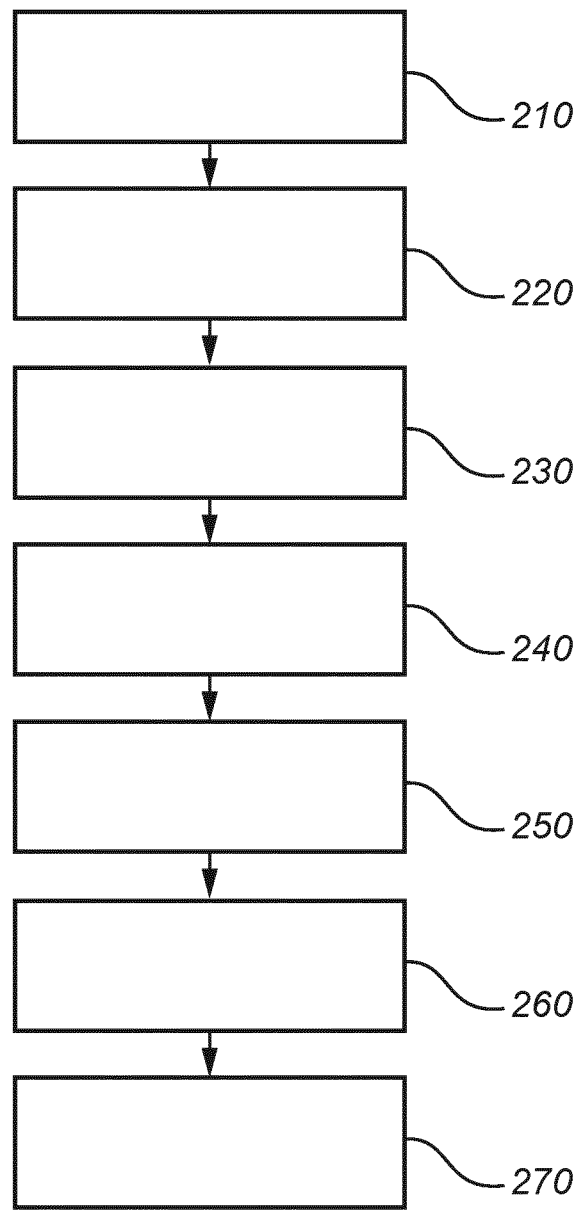
FIG. 6 is a flow chart illustrating methods of the present disclosure.

FIG. 6 is a flowchart illustrating a method in a monitoring system according to any of the embodiments of FIGS. 1-5. Thus, the method may involve monitoring the movement of a person in an environment comprising an equipment device associated with an alert zone. More specifically, a signal S1 from the portable device 130 may be received 210 at a transceiver 110 arranged at a predetermined position relative to the alert zone 150. The received signal S1 may be processed by a controller 140 so as to determine 220 the location of the portable device 130, followed by a verification step in which it is verified 230 whether the determined location is within the alert zone 150 of not. In case the determined location is verified to be within the alert zone 150 an alert signal S2 may be generated 240. The alert signal S2 may trigger the notification 250 of the person carrying or wearing the portable device 120 so as to avoid accidental exposure to live parts of the equipment device 120. Alternatively, or additionally the alert signal S2 may trigger the entry 260 of the equipment device 120 into a safe mode, in which the equipment device 120 may be de-energised.

In some examples, the method may comprise sending 270 the determined location to another, remotely arranged controller. The determined location may for example be shared with another substation, as outlined above, so as to hinder the equipment from being energized by the other substation.

Alternatively, the location of the person carrying the portable device 110 may be checked prior to the equipment device being energized, so as to avoid energizing the equipment device in case a person is too close to the equipment device.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A monitoring system for an electrical network, comprising one or both of a transmission network or distribution network, the monitoring system comprising:
   a short-range wireless transceiver arranged at a predetermined position relative to an equipment device of the electrical network and configured to receive a signal from a portable device; and
   a controller configured to determine a location of the portable device based at least partially on the received signal and to verify if the determined location is within a predetermined alert zone at least partly surrounding the equipment device;
   wherein the controller is further configured to
      receive information indicating whether the equipment device is energised or de-energised, and
      generate an alert signal in case the determined location is verified to be within the alert zone and the equipment device is energised.

2. The monitoring system according to claim 1, wherein the short-range wireless transceiver is configured to transmit the alert signal to the portable device.

3. The monitoring system according to claim 1, wherein the controller is configured to transmit the alert signal to a safety block mechanism.

4. A monitoring system for an electrical network, comprising one or both of a transmission network or distribution network, the monitoring system comprising:

a short-range wireless transceiver arranged at a predetermined position relative to an equipment device of the electrical network and configured to receive a signal from a portable device; and
a controller configured to determine a location of the portable device based at least partially on the received signal and to verify if the determined location is within a predetermined alert zone at least partly surrounding the equipment device;
wherein the controller is further configured to
generate an alert signal in case the determined location is verified to be within the alert zone, and
transmit the alert signal to a safety block mechanism, wherein the safety block mechanism is configured to either cause the equipment device to enter a safe mode in response to receipt of the alert signal, or prevent the equipment device from being energised in case the alert signal is received.

5. The monitoring system according to claim 3, wherein the safety block mechanism is configured to prevent the equipment device from being energised in case the alert signal is received.

6. The monitoring system according to claim 1, wherein the controller is configured to determine the location of the portable device based on a determined distance between the portable device and the short-range wireless transceiver, and further on determined directional information of the signal from the portable device.

7. The monitoring system according to claim 6, wherein the short-range wireless transceiver comprises an array of antennas allowing for the directional information to be determined as angle of arrival of the signal from the portable device.

8. The monitoring system according to claim 1, wherein the portable device is arranged in a garment or a personal protective accessory.

9. A monitoring system for an electrical network, comprising one or both of a transmission network or distribution network, the monitoring system comprising:
a short-range wireless transceiver arranged at a predetermined position relative to an equipment device of the electrical network and configured to receive a signal from a portable device; and
a controller configured to determine a location of the portable device based at least partially on the received signal and to verify if the determined location is within a predetermined alert zone at least partly surrounding the equipment device;
wherein the controller is further configured to generate an alert signal in case the determined location is verified to be within the alert zone, and
wherein the controller is comprised in the short-range wireless transceiver.

10. The monitoring system according to claim 1, comprising a plurality of short-range wireless transceivers, each of which being configured to receive the signal from the portable device, and further being communicatively connected to the controller.

11. The monitoring system according to claim 10, wherein the controller is configured to determine the location of the portable device by means of triangulation between two or more of the short-range wireless transceivers.

12. The monitoring system according to claim 10, wherein the controller is further configured to track movement of the portable device and store the movement in a database.

13. The monitoring system according to claim 1, wherein the equipment device forms part of a first substation of the electrical network, and wherein the controller is configured to share the determined location with a control system of a second substation.

14. A monitoring method, comprising:
by a transceiver, receiving a signal from a portable device;
determining a location of the portable device relative to an alert zone at least partly surrounding an equipment device of an electrical network, comprising one or both of a transmission network or distribution network, wherein the location is determined at least partially on the received signal and a predetermined position of the transceiver relative to the equipment device;
verifying if the determined location is within the alert zone;
receiving information indicating whether the equipment device is energised or de-energised; and
generating an alert signal in case the determined location is within the alert zone and the equipment device is energised.

15. The monitoring method according to claim 14, further comprising, by the transceiver, transmitting the alert signal to the portable device.

16. A monitoring method, comprising:
by a transceiver, receiving a signal from a portable device;
determining a location of the portable device relative to an alert zone at least partly surrounding an equipment device of an electrical network, comprising one or both of a transmission network or distribution network, wherein the location is determined at least partially on the received signal and a predetermined position of the transceiver relative to the equipment device;
verifying if the determined location is within the alert zone;
generating an alert signal in case the determined location is within the alert zone; and
transmitting the alert signal to a safety block mechanism that is configured to either cause the equipment device to enter a safe mode in response to receipt of the alert signal, or prevent the equipment device from being energised in case the alert signal is received.

17. The monitoring method according to claim 14, further comprising transmitting the alert signal to a safety block mechanism that is configured to prevent the equipment device from being energised in case the alert signal is received.

18. The monitoring method according to claim 14, further comprising determining the location of the portable device based on a determined distance between the portable device and the transceiver, and further on determined directional information of the signal from the portable device.

* * * * *